United States Patent
Saitoh et al.

(10) Patent No.: US 12,117,694 B2
(45) Date of Patent: Oct. 15, 2024

(54) OPTICAL ELEMENT AND REFLECTIVE SHEET

(71) Applicant: FUJIFILM Corporation, Tokyo (JP)

(72) Inventors: Yukito Saitoh, Minamiashigara (JP); Akiko Watano, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/151,523

(22) Filed: Jan. 9, 2023

(65) Prior Publication Data
US 2023/0161199 A1  May 25, 2023

Related U.S. Application Data

(63) Continuation of application No. PCT/JP2021/023886, filed on Jun. 24, 2021.

(30) Foreign Application Priority Data

Jul. 31, 2020  (JP) .................. 2020-130505

(51) Int. Cl.
*G02F 1/13363* (2006.01)
*G02F 1/1335* (2006.01)
*G02F 1/137* (2006.01)

(52) U.S. Cl.
CPC .... *G02F 1/13363* (2013.01); *G02F 1/133541* (2021.01); *G02F 1/133553* (2013.01); *G02F 1/13718* (2013.01)

(58) Field of Classification Search
CPC ........... G02F 1/13363; G02F 1/133541; G02F 1/133553; G02F 1/13718
See application file for complete search history.

(56) References Cited

U.S. PATENT DOCUMENTS

| | | | | |
|---|---|---|---|---|
| 2001/0003473 A1* | 6/2001 | Galabova | ............... | C09K 19/00 349/98 |
| 2002/0021392 A1* | 2/2002 | Ohtake | ............. | G02F 1/133553 349/115 |

(Continued)

FOREIGN PATENT DOCUMENTS

| | | |
|---|---|---|
| EP | 2 617 795 A2 | 7/2013 |
| JP | 5-107660 A | 4/1993 |

(Continued)

OTHER PUBLICATIONS

JP 2019028474 A translation (Year: 2019).*

(Continued)

*Primary Examiner* — James A Dudek
(74) *Attorney, Agent, or Firm* — Birch, Stewart, Kolasch & Birch, LLP

(57) ABSTRACT

An optical element includes a cholesteric liquid crystal layer obtained by cholesterically aligning a liquid crystal compound, in which the cholesteric liquid crystal layer has a region where a refractive index nx in a slow axis direction and a refractive index ny in a fast axis direction in a plane satisfy nx>ny, a helical axis of the cholesteric alignment is parallel to a thickness direction of the cholesteric liquid crystal layer, and a helical pitch in the cholesteric alignment gradually changes in the thickness direction of the cholesteric liquid crystal layer.

7 Claims, 5 Drawing Sheets

(56) References Cited

U.S. PATENT DOCUMENTS

| | | | |
|---|---|---|---|
| 2002/0176167 A1* | 11/2002 | Kashima | G02B 5/3033 |
| | | | 359/489.2 |
| 2003/0151704 A1* | 8/2003 | Kawamoto | G02F 1/13362 |
| | | | 349/96 |
| 2005/0001955 A1* | 1/2005 | Yoon | G02F 1/133528 |
| | | | 349/96 |
| 2007/0258024 A1 | 11/2007 | Parri et al. | |
| 2020/0122555 A1 | 4/2020 | Nimura et al. | |

FOREIGN PATENT DOCUMENTS

| | | |
|---|---|---|
| JP | 2008-505369 A | 2/2008 |
| JP | 2010-111104 A | 5/2010 |
| JP | 2019-28474 A | 2/2019 |
| WO | WO 2016/017728 A1 | 2/2016 |
| WO | WO 2018/062424 A1 | 4/2018 |
| WO | WO 2019/009252 A1 | 1/2019 |
| WO | WO 2019/187951 A1 | 10/2019 |

OTHER PUBLICATIONS

JP WO2016017728 A1 translation (Year: 2016).*
JP 2001318225 A translation (Year: 2001).*
International Preliminary Report on Patentability and Written Opinion of the International Searching Authority (Forms PCT/IB/326, PCT/IB/373, and PCT/ISA/237) for International Application No. PCT/JP2021/023886, dated Feb. 9, 2023, with an English translation.
International Search Report (Form PCT/ISA/210) for International Application No. PCT/JP2021/023886, dated Sep. 7, 2021, with an English translation.
Japanese Office Action for corresponding Japanese Application No. 2022-540069, dated Oct. 31, 2023, with English translation.

* cited by examiner

OPTICAL ELEMENT AND REFLECTIVE SHEET

CROSS-REFERENCE TO RELATED APPLICATIONS

This application is a Continuation of PCT International Application No. PCT/JP2021/023886 filed on Jun. 24, 2021, which claims priority under 35 U.S.C § 119(a) to Japanese Patent Application No. 2020-130505 filed on Jul. 31, 2020. Each of the above application(s) is hereby expressly incorporated by reference, in its entirety, into the present application.

BACKGROUND OF THE INVENTION

1. Field of the Invention

The present invention relates to an optical element including a cholesteric liquid crystal layer and a reflective sheet including the optical element.

2. Description of the Related Art

A cholesteric liquid crystal layer that is obtained by immobilizing a cholesteric liquid crystalline phase has wavelength selectivity where only light in a specific wavelength range is selectively reflected, and further selectively reflects only circularly polarized light in one turning direction, for example, any one of right circularly polarized light or left circularly polarized light.

The use of the cholesteric liquid crystal layer for various applications utilizing characteristics thereof is considered.

As a screen used for a projection type image display apparatus, a transparent screen that reflects projection light projected from a projector to display an image and allows transmission of light from a front surface (display surface) and a back surface is known. The use of the cholesteric liquid crystal layer as the transparent screen is considered.

For example, JP1993-107660A (JP-H5-107660A) describes a projection type liquid crystal projection system including a transparent screen in which a cholesteric liquid crystal that reflects red light, green light, and blue light of right circularly polarized light or left circularly polarized light is used. In the projection type liquid crystal projection, transmission of a circularly polarized light component having a turning direction opposite to projection light in external light is allowed by polarizing red light, green light, and blue light projected to the transparent screen into right circularly polarized light or left circularly polarized light using a λ/4 plate.

In addition, the use of the cholesteric liquid crystal layer as a decorative sheet that decorates surfaces of various devices and members such as home electric appliances, office machines, or automobile components is considered.

For example, JP2010-111104A describes a decorative sheet including a laminate that includes a first cholesteric liquid crystal layer and a second cholesteric liquid crystal layer, in which the first cholesteric liquid crystal layer is a layer that allows transmission of first circularly polarized light and reflects second circularly polarized light having a turning direction opposite to that of the first circularly polarized light, and the second cholesteric liquid crystal layer is disposed to reflect at least a part of the first circularly polarized light transmitted through the first cholesteric liquid crystal layer.

SUMMARY OF THE INVENTION

As is well-known, a reflection wavelength range where the cholesteric liquid crystal layer selectively reflects light depends on a helical pitch of a cholesteric liquid crystalline phase. As the helical pitch increases, the cholesteric liquid crystal layer selectively reflects light having a longer wavelength.

Here, the cholesteric liquid crystal layer can selectively reflect only light in one wavelength range depending on the length of a helical pitch in a helical structure.

Therefore, for example, in order to select light components in two distant wavelength ranges, for example, red light and blue light or infrared light and red light, it is necessary to use two cholesteric layers having different reflection wavelength ranges.

An object of the present invention is to solve the above-described problem of the related art and to provide: an optical element where light components in two distant wavelength ranges can be selectively reflected using one cholesteric liquid crystal layer and a reflection wavelength range is also sufficiently wide; and a reflective sheet including the optical element.

In order to achieve the object, the present invention has the following configurations.

[1] An optical element comprising:
  a cholesteric liquid crystal layer obtained by cholesterically aligning a liquid crystal compound,
  in which the cholesteric liquid crystal layer has a region where a refractive index nx in a slow axis direction and a refractive index ny in a fast axis direction in a plane satisfy nx>ny,
  a helical axis of the cholesteric alignment is parallel to a thickness direction of the cholesteric liquid crystal layer, and
  a helical pitch in the cholesteric alignment gradually changes in the thickness direction of the cholesteric liquid crystal layer.

[2] The optical element according to [1],
  in which the cholesteric liquid crystal layer has a peak of reflection at a selective reflection center wavelength $\lambda$ and a wavelength $\lambda/2$,
  the selective reflection center wavelength $\lambda$ is a wavelength range of invisible light, and
  the wavelength $\lambda/2$ is a wavelength range of visible light.

[3] The optical element according to [2],
  in which the selective reflection center wavelength $\lambda$ is a wavelength range of infrared light.

[4] The optical element according to any one of [1] to [3],
  in which the cholesteric liquid crystal layer has a region where the refractive index nx in the slow axis direction and the refractive index ny in the fast axis direction satisfy nx>ny and a region where the refractive index nx in the slow axis direction and the refractive index ny in the fast axis direction satisfy nx=ny.

[5] A reflective sheet comprising:
  the optical element according to any one of [1] to [4].

According to the present invention, it is possible to provide: an optical element where light components in two distant wavelength ranges can be selectively reflected using one cholesteric liquid crystal layer and a reflection wavelength range is also sufficiently wide; and a reflective sheet including the optical element.

DESCRIPTION OF THE PREFERRED EMBODIMENTS

Hereinafter, an optical element and a reflective sheet according to an embodiment of the present invention will be described in detail based on a preferred embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although the present invention is not limited thereto, infrared light (infrared ray) refers to light in a wavelength range of longer than 780 nm and 1 mm or shorter. In particular, a near infrared range refers to light in a wavelength range of longer than 780 nm and 2000 nm or shorter.

Further, although not limited thereto, in visible light, light in a wavelength range of 420 to 490 nm refers to blue light, light in a wavelength range of 495 to 570 nm refers to green light, and light in a wavelength range of 620 to 750 nm refers to red light.

In the present specification, a selective reflection center wavelength refers to an average value of two wavelengths at which, in a case where a minimum value of a transmittance of a target object (member) is represented by Tmin (%), a half value transmittance: T½ (%) represented by the following expression is exhibited.

Figure 1:
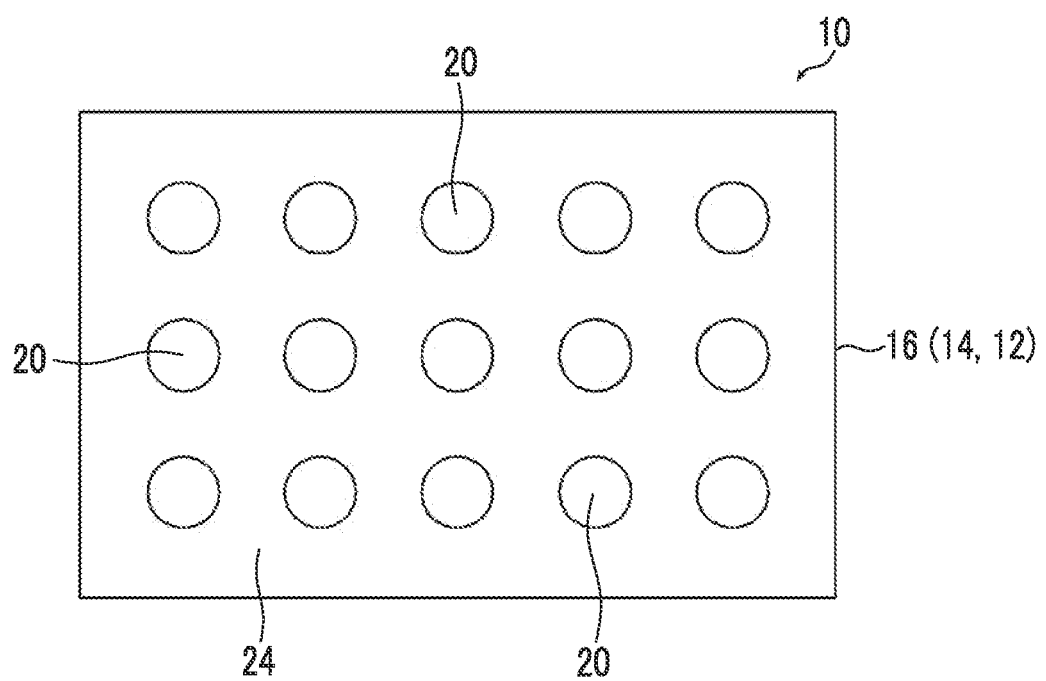
FIG. 1 is a plan view conceptually showing an example of a reflective sheet according to the present invention.
Figure 2:
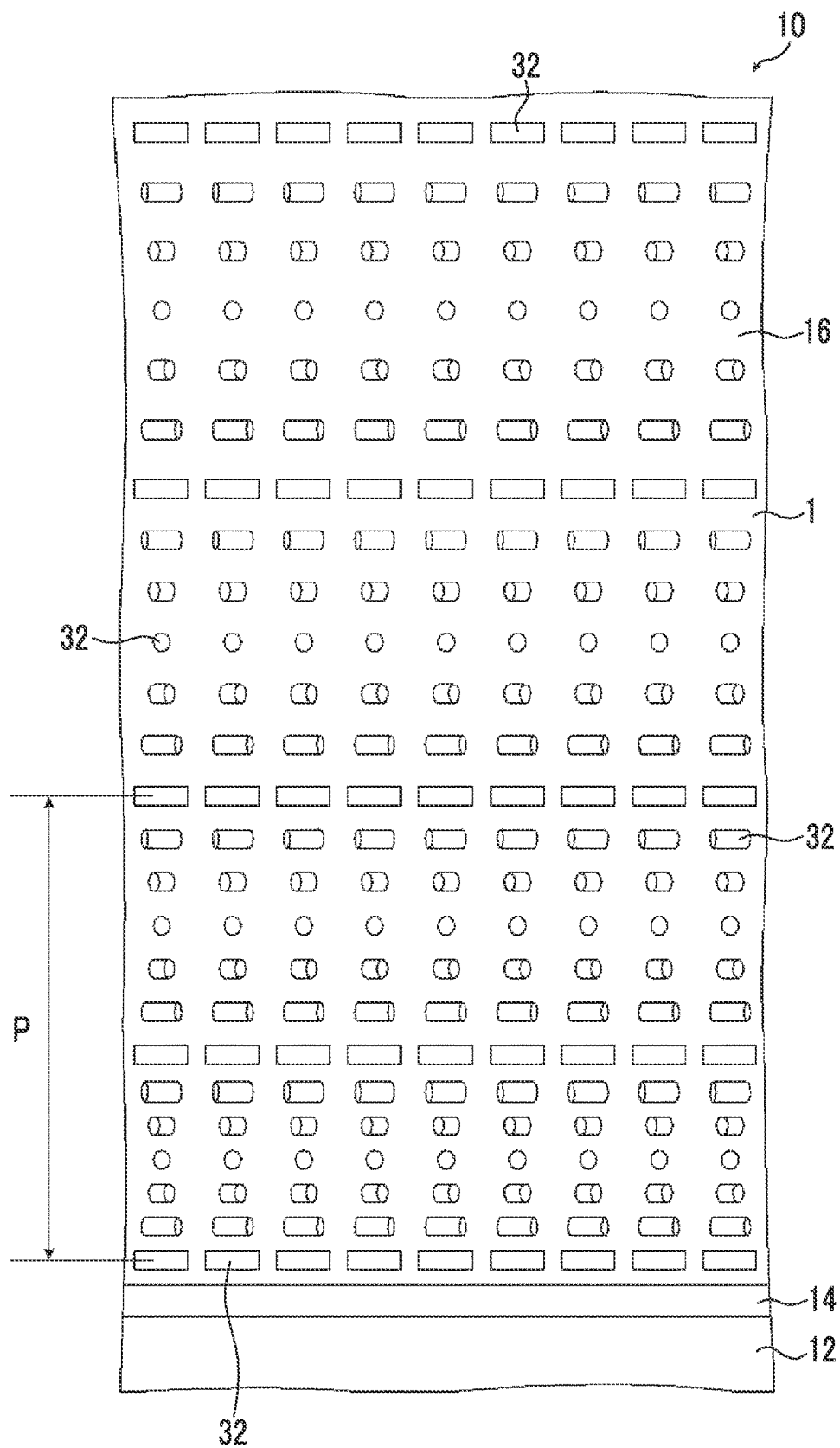
FIG. 2 is a diagram conceptually showing a layer configuration of the reflective sheet shown in FIG. 1.

Expression for obtaining Half Value Transmittance:
$T\frac{1}{2}=100-(100-Tmin)\div 2$ FIG. 1 conceptually shows a plan view of an example of the reflective sheet according to the embodiment of the present invention including an example of the optical element according to the embodiment of the present invention. FIG. 2 conceptually shows a layer configuration of the optical element shown in FIG. 1.

The plan view is a view in a case where the reflective sheet according to the embodiment of the present invention is seen from a thickness direction. That is, FIG. 1 is a diagram in a case where the reflective sheet according to the embodiment of the present invention is seen from a laminating direction of respective layers in FIG. 2. Accordingly, FIG. 1 is a plan view showing a cholesteric liquid crystal layer described below.

As shown in FIGS. 1 and 2, a reflective sheet 10 includes a support 12, an alignment film 14, and a cholesteric liquid crystal layer 16.

The cholesteric liquid crystal layer 16 is a cholesteric liquid crystal layer that forms the optical element according to the embodiment of the present invention. That is, the cholesteric liquid crystal layer 16 is obtained by cholesterically aligning a liquid crystal compound. In other words, the cholesteric liquid crystal layer 16 is obtained by immobilizing a cholesteric liquid crystalline phase.

In the present invention, the cholesteric liquid crystal layer 16 is a typical cholesteric liquid crystal layer that does not have an alignment pattern or the like of a liquid crystal compound (optical axis) in a plane, except that it has a refractive index ellipsoid described below. Accordingly, a helical axis of the cholesteric alignment (helical structure) in the cholesteric liquid crystal layer 16 is parallel to a thickness direction of the cholesteric liquid crystal layer.

In other words, the thickness direction is a laminating direction of respective layers (films) in the reflective sheet 10.

In addition, in the reflective sheet 10, the cholesteric liquid crystal layer 16 has a pitch gradient structure in which the helical pitch of the helical axis direction in the cholesteric alignment gradually changes in a thickness direction of the cholesteric liquid crystal layer.

In the following description, the pitch gradient structure will also be referred to as the PG structure.

Further, in the reflective sheet 10, the cholesteric liquid crystal layer 16 has a region where a refractive index nx in a slow axis direction and a refractive index ny in a fast axis direction in a plane satisfy nx>ny.

Figure 3:
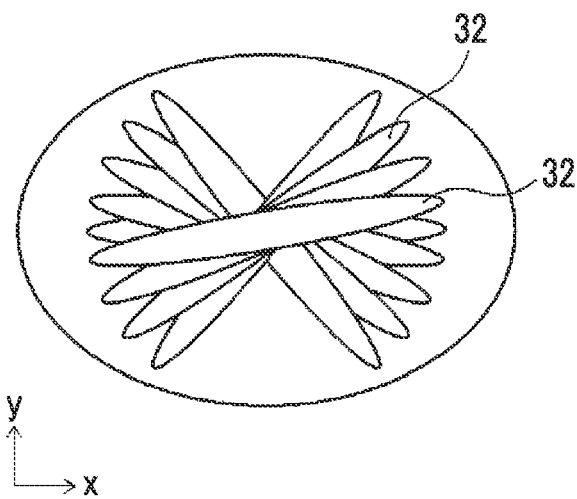
FIG. 3 is a conceptual diagram in a case where a part of a liquid crystal compound of the cholesteric liquid crystal layer shown in FIG. 2 is seen from a helical axis direction.

In the present invention, the cholesteric liquid crystal layer 16 has a configuration in which, in a case where the arrangement of the liquid crystal compounds 32 is seen from the helical axis direction, an angle between the molecular axes of the liquid crystal compounds 32 adjacent to each other gradually changes as conceptually shown in FIG. 3. In other words, in the cholesteric liquid crystal layer 16, in a case where the arrangement of the liquid crystal compounds 32 is seen from the helical axis direction, the existence probability of the liquid crystal compounds 32 varies.

As a result, in the cholesteric liquid crystal layer 16, the refractive index nx in the slow axis direction and the refractive index ny in the fast axis direction in the plane satisfy nx>ny.

In the following description, the cholesteric liquid crystal layer 16 having a configuration in which, in a case where the arrangement of the liquid crystal compounds is seen from the helical axis direction, an angle between the molecular axes of the liquid crystal compounds adjacent to each other gradually changes as shown in FIG. 3 will also be referred to as the cholesteric liquid crystal layer 16 having a refractive index ellipsoid.

As is well-known, the selective reflection wavelength of the cholesteric liquid crystal layer depends on the length of the helical pitch of the cholesteric liquid crystalline phase.

A typical cholesteric liquid crystal layer can selectively reflect only light in one wavelength range corresponding to the length of the helical pitch.

On the other hand, in the present invention, in the cholesteric liquid crystal layer 16, the region where the refractive index nx in the slow axis direction and the refractive index ny in the fast axis direction in the plane satisfy nx>ny selectively reflects light components in two distant wavelength ranges including a wavelength range corresponding to a selective reflection center wavelength λ that depends on the length of the helical pitch and a wavelength range corresponding to a wavelength λ/2 that is half of the selective reflection center wavelength λ.

This point will be described below.

In the reflective sheet 10 in the example shown in the drawing, the cholesteric liquid crystal layer 16 includes: a first region 20 where the refractive index nx in the slow axis direction and the refractive index ny in the fast axis direction in the plane satisfy nx>ny and; a second region 24 as a typical cholesteric liquid crystalline phase where the refractive index nx in the slow axis direction and the refractive index ny in the fast axis direction in the plane satisfy nx=ny.

That is, the cholesteric liquid crystal layer 16 includes: the second region 24 that selectively reflects only light in the wavelength range corresponding to the selective reflection center wavelength λ depending on the length of the helical pitch; and the first region that selectively reflects only the light components in the two distant wavelength ranges that includes the wavelength range corresponding to the selective reflection center wavelength λ and the wavelength range corresponding to the wavelength λ/2 that is half of the selective reflection center wavelength λ.

In the cholesteric liquid crystal layer 16 in the example shown the drawing, 15 circular first regions 20 are arranged in a 3×5 array to be spaced from each other in the second region 24. That is, in the cholesteric liquid crystal layer 16, 15 first regions 20 are formed in a sea-island shape to be arranged in a 3×5 array in the second region 24.

In FIG. 2, the number of helices in the helical structure (cholesteric structure) in the thickness direction of the cholesteric liquid crystal layer 16 is slightly less than two pitches. Actually, a helical structure corresponding to at least several pitches is provided.

In addition, as described above, the cholesteric liquid crystal layer 16 has the PG structure. Therefore, the helical pitch of the helical structure gradually changes in the thickness direction of the cholesteric liquid crystal layer. In the example in the drawing, for example, the helical pitch gradually increases upward in the drawing, that is, in a direction away from the alignment film 14. In the present invention, the PG structure of the cholesteric liquid crystal layer is not limited to this example. Conversely, the helical pitch may gradually decrease upward in the drawing.

In order to clearly show the configuration of the cholesteric liquid crystal layer 16, FIG. 2 shows a cholesteric liquid crystal layer not having the refractive index ellipsoid.

As described above, the reflective sheet 10 shown in FIGS. 1 and 2 includes the support 12, the alignment film 14 that is formed on a surface of the support 12, and the cholesteric liquid crystal layer 16 that is formed on a surface of the alignment film 14.

In the following description, in the reflective sheet 10, the support 12 side will also be referred to as "lower side", and the cholesteric liquid crystal layer 16 side will also be referred to as "upper side".

The layer configuration of the reflective sheet according to the embodiment of the present invention, that is, the optical element is not limited to the configuration shown in FIG. 2 including the support 12, the alignment film 14, and the cholesteric liquid crystal layer 16.

For example, the reflective sheet (optical element) according to the embodiment of the present invention may consist of the alignment film 14 and the cholesteric liquid crystal layer 16 by peeling off the support 12 from the reflective sheet 10 shown in FIG. 2. Alternatively, the reflective sheet according to the embodiment of the present invention may consist of only the cholesteric liquid crystal layer 16 by peeling off the support 12 and the alignment film 14 from the reflective sheet 10 shown in FIG. 2. Alternatively, the reflective sheet according to the embodiment of the present invention may be an element where another support (substrate, base material) is bonded to the cholesteric liquid crystal layer by peeling off the support 12 and the alignment film 14 from the reflective sheet 10 shown in FIG. 2. Further, in the reflective sheet according to the embodiment of the present invention, the cholesteric liquid crystal layer 16 may be formed directly on the surface of the support 12.

That is, the reflective sheet (optical element) according to the embodiment of the present invention can adopt various configurations as long as it includes the cholesteric liquid crystal layer that has the region where the refractive indices satisfy nx>ny, has the configuration in which the helical axis of the cholesteric alignment (helical structure) is parallel to the thickness direction of the cholesteric liquid crystal layer, and further has the PG structure.

<Support>

The support 12 supports the alignment film 14 and the cholesteric liquid crystal layer 16.

As the support 12, various sheet-shaped materials (films or plate-shaped materials) can be used as long as they can support the alignment film 14 and the cholesteric liquid crystal layer 16.

The thickness of the support 12 is not particularly limited and may be appropriately set depending on the use of the optical element, a material for forming the support 12, and the like in a range where the alignment film 14 and the cholesteric liquid crystal layer 16 can be supported. In addition, the support 12 does not need to have transmittance with respect to visible light.

The thickness of the support 12 is preferably 1 to 2000 μm, more preferably 3 to 500 μm, and still more preferably 5 to 250 μm.

The support 12 may have a monolayer structure or a multi-layer structure.

In a case where the support 12 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a monolayer structure that is provided as a substrate; and another layer that is provided on a surface of the substrate.

<Alignment Film>

In the reflective sheet 10, the alignment film 14 is formed on a surface of the support 12.

The alignment film 14 is an alignment film for aligning the liquid crystal compound 32 to a predetermined liquid crystal alignment pattern during the formation of the cholesteric liquid crystal layer 16.

As the alignment film 14, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 14 may be formed using a well-known method corresponding to a material for forming the alignment film.

The alignment film 14 formed by a rubbing treatment can be formed by rubbing a surface of a polymer layer with paper or fabric in a given direction multiple times.

As the material used for the alignment film 14, for example, a material for forming polyimide, polyvinyl alcohol, a polymer having a polymerizable group described in JP1997-152509A (JP-H9-152509A), or an alignment film 14 such as JP2005-97377A, JP2005-99228A, and JP2005-128503A is preferable.

The alignment film 14 can also be suitably used as a so-called photo-alignment film obtained by irradiating a photo-alignment material with polarized light or non-polarized light. That is, a photo-alignment film that is formed by applying a photo-alignment material to the support 12 is suitably used as the alignment film 14.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 14 is not particularly limited. The thickness with which a required alignment function can be obtained may be appropriately set depending on the material for forming the alignment film 14.

For example, the thickness of the alignment film 14 is preferably 0.01 to 5 μm and more preferably 0.05 to 2 μm.

As described above, in the reflective sheet (optical element) according to the embodiment of the present invention, the alignment film 14 is not an essential component.

For example, the support 12 may also function as an alignment film by performing an alignment treatment such as a rubbing treatment or laser processing on the support 12 instead of forming the alignment film 14.

<Cholesteric Liquid Crystal Layer>

In the reflective sheet 10, the cholesteric liquid crystal layer 16 is formed on the surface (upper surface) of the alignment film 14.

As described above, in the reflective sheet 10 including the optical element according to the embodiment of the present invention, the cholesteric liquid crystal layer 16 is a cholesteric liquid crystal layer obtained by immobilizing a cholesteric liquid crystalline phase. In the present invention, the helical axis in the helical structure of the cholesteric liquid crystal layer 16 (cholesteric liquid crystalline phase) is parallel to the thickness direction of the cholesteric liquid crystal layer 16.

In the reflective sheet 10, the cholesteric liquid crystal layer 16 has the pitch gradient (PG) structure where the helical pitch of the helical structure gradually changes in the thickness direction of the cholesteric liquid crystal layer.

In the example shown in the drawing, for example, the cholesteric liquid crystal layer 16 has the PG structure where the helical pitch is gradually widened upward in the drawing in the thickness direction, that is, in a direction away from the support 12 (alignment film 14).

Further, in the reflective sheet 10, the cholesteric liquid crystal layer 16 includes the first region 20 and the second region 24, in which the circular dot-like first regions 20 are scattered in the second region 24.

The first region 20 is a region having the refractive index ellipsoid where the refractive index nx in the slow axis direction and the refractive index ny in the fast axis direction in the plane satisfy nx>ny. Therefore, the first region 20 selectively reflects the light components in the two distant wavelength ranges including the wavelength range having, as a peak, the original selective reflection center wavelength λ of the cholesteric liquid crystal layer 16 and the wavelength range having, as a peak, the wavelength λ/2 that is (substantially) half of the selective reflection center wavelength λ.

On the other hand, the second region 24 is a general cholesteric liquid crystalline phase where the refractive index nx in the slow axis direction and the refractive index ny in the fast axis direction in the plane satisfy nx=ny. Accordingly, the second region 24 selectively reflects only the light in the wavelength range having, as a peak, the selective reflection center wavelength λ depending on the helical pitch of the cholesteric liquid crystal layer.

As conceptually shown in FIG. 2, the cholesteric liquid crystal layer 16 has a helical structure in which the liquid crystal compound 32 is helically turned and laminated as in a cholesteric liquid crystal layer obtained by immobilizing a typical cholesteric liquid crystalline phase. In the helical structure, a configuration in which the liquid crystal compound 32 is helically rotated once (rotated by 360) and laminated is set as one helical pitch, and plural pitches of the helically turned liquid crystal compounds 32 are laminated.

As is well-known, the cholesteric liquid crystal layer obtained by immobilizing a cholesteric liquid crystalline phase has wavelength-selective reflectivity.

In addition, although described below in detail, the selective reflection wavelength range of the cholesteric liquid crystal layer depends on the length (pitch P shown in FIG. 2) of one helical pitch described above in the thickness direction.

<<Cholesteric Liquid Crystalline Phase>>

It is known that the cholesteric liquid crystalline phase exhibits selective reflectivity at a specific wavelength.

A central wavelength of selective reflection (selective reflection center wavelength λ) of a general cholesteric liquid crystalline phase depends on a helical pitch P in the cholesteric liquid crystalline phase and satisfies a relationship of λ=n×P with an average refractive index n of the cholesteric liquid crystalline phase.

Therefore, the selective reflection center wavelength can be adjusted by adjusting the helical pitch. The selective reflection center wavelength of the cholesteric liquid crystalline phase increases as the helical pitch P increases.

As described above, the helical pitch P corresponds to one pitch (helical period) of the helical structure of the cholesteric liquid crystalline phase. In other words, the helical pitch P refers to one helical winding, that is, the length in a helical axis direction in which a director (in a rod-like liquid crystal, a major axis direction) of the liquid crystal compound constituting the cholesteric liquid crystalline phase rotates by 360°.

In a case where a cross-section of the cholesteric liquid crystal layer is observed with a scanning electron microscope (SEM), a stripe pattern in which bright portions (bright lines) and dark portions (dark lines) derived from a cholesteric liquid crystalline phase are alternately laminated in the thickness direction is observed. The helical pitch, that is, the pitch P is equal to the length corresponding to two bright lines and two dark lines in the thickness direction, that is, the length corresponding to two dark lines and two bright lines in the thickness direction.

Here, the cholesteric liquid crystal layer 16 forming the reflective sheet 10 has the PG structure where the helical pitch gradually changes in the thickness direction of the cholesteric liquid crystal layer. As described above, the cholesteric liquid crystal layer 16 in the example shown in the drawing has the PG structure where the helical pitch (pitch P) gradually increases upward, that is, in the direction away from the alignment film 14.

Therefore, in a case where a cross-section of the cholesteric liquid crystal layer 16 in the example shown in the drawing is observed with a SEM, an interval of stripe patterns formed by the bright portions and the dark portions gradually increases upward.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fujifilm Research & Development" No. 50 (2005), pp. 60 to 63. As a method of measuring a sense of helix and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited, that is, the half-width of the wavelength range corresponding to the wavelength $\lambda$ depends on $\Delta n$ of the cholesteric liquid crystalline phase and the helical pitch P and complies with a relationship of $\Delta\lambda=\Delta n \times P$.

Therefore, the width of the selective reflection wavelength range corresponding to the wavelength $\lambda$ can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 32 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used.

Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies. The chiral agent in which back isomerization, dimerization, isomerization, dimerization or the like occurs due to light irradiation such that the helical twisting power (HTP) changes is preferable.

In order to form the cholesteric liquid crystal layer 16 having the PG structure, the chiral agent in which the HTP changes is used. By irradiating the liquid crystal composition with light having a wavelength at the HTP of the chiral agent changes before or during the curing of the liquid crystal composition for forming the cholesteric liquid crystal layer, the cholesteric liquid crystal layer having the PG structure can be formed.

In a chiral agent in which the HTP decreases during light irradiation, in general, HTP decreases during light irradiation.

As the chiral agent, any well-known chiral agents can be used as long as the HTP thereof changes by light irradiation. A chiral agent having a molar absorption coefficient of 30000 or higher at a wavelength of 313 nm is preferably used.

The chiral agent has a function of causing a helical structure of a cholesteric liquid crystalline phase to be formed. The chiral compound may be selected depending on the purpose because a sense of helix or a helical pitch induced from the compound varies.

As the chiral agent, a well-known compound can be used, but a compound having a cinnamoyl group is preferable.

Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-80478A, JP2002-80851A, JP2010-181852A, and JP2014-034581A.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group.

In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01% to 200 mol % and more preferably 1% to 30 mol % with respect to the amount of the liquid crystal compound.

The cholesteric liquid crystal layer 16 having the PG structure is formed of a liquid crystal composition including the chiral agent where the HTP changes by light irradiation, and can be formed by light irradiation for changing the HTP of the chiral agent before the curing of the liquid crystal composition.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

In particular, it is preferable that the polymerization initiator is a dichroic polymerization initiator.

The dichroic polymerization initiator refers to a polymerization initiator that has absorption selectivity with respect to light in a specific polarization direction and is excited by the polarized light to generate a free radical among photopolymerization initiators. That is, the dichroic polymerization initiator refers to a polymerization initiator having different absorption selectivities between light in a specific polarization direction and light in a polarization direction perpendicular to the light in the specific polarization direction.

The details and specific examples of the polymerization initiator are described in WO2003/054111A.

Specific examples of the dichroic polymerization initiator include polymerization initiators represented by the following chemical formulas. In addition, as the dichroic polymerization initiator, a polymerization initiator described in paragraphs "0046" to "0097" of JP2016-535863A.

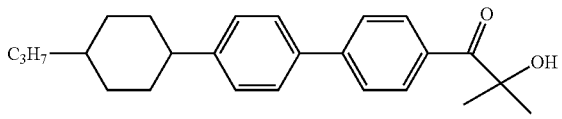

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. The crosslinking agents may be used alone or in combination of two or more kinds.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. The organic solvents may be used alone or in combination of two or more kinds. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 14, it is preferable that the cholesteric liquid crystal layer obtained by immobilizing a cholesteric liquid crystalline phase is formed by applying the liquid crystal composition to the alignment film 14, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

Although described below in detail, in the optical element according to the embodiment of the present invention, the cholesteric liquid crystal layer 16 has the PG structure where the helical pitch of the cholesteric liquid crystalline phase gradually changes in the thickness direction.

Further, in the optical element according to the embodiment of the present invention, the cholesteric liquid crystal layer 16 includes: the first region 20 having the refractive index ellipsoid where the refractive index nx in the slow axis direction and the refractive index nx in the fast axis direction in the plane satisfy nx>ny; and the second region 24 that is a typical cholesteric liquid crystalline phase where nx=ny is satisfied.

Therefore, in order to form the cholesteric liquid crystal layer 16 of the optical element according to the embodiment of the present invention, for example, the liquid crystal composition is applied and is irradiated with light for changing the HTP of the chiral agent in the liquid crystal composition. Next, the alignment of the cholesteric liquid crystalline phase by drying and/or heating is performed. Next, the irradiation of polarized light for satisfying nx>ny, that is, for forming the refractive index ellipsoid is performed on a region corresponding to the first region 20 using a mask where an opening portion corresponding to the first region 20 is formed. Next, the liquid crystal compound 32 is cured and further polymerized.

The thickness of the cholesteric liquid crystal layer is not particularly limited, and the thickness with which a required light reflectivity can be obtained may be appropriately set depending on the use of the cholesteric liquid crystal layer, the light reflectivity required for the cholesteric liquid crystal layer, the material for forming the cholesteric liquid crystal layer, and the like.

(Liquid Crystal Elastomer)

A liquid crystal elastomer may be used for the cholesteric liquid crystal layer 16 according to the embodiment of the present invention.

The liquid crystal elastomer is a hybrid material of liquid crystal and an elastomer.

The liquid crystal elastomer has a structure in which a liquid crystalline rigid mesogenic group is introduced into a flexible polymer network having rubber elasticity. Therefore, the liquid crystal elastomer has flexible mechanical characteristics and elasticity.

In addition, the alignment state of liquid crystal and the macroscopic shape of the system strongly correlate to each other. In a state where the alignment state of liquid crystal changes depending on a temperature, an electric field, or the like, macroscopic deformation corresponding to a change in alignment degree occurs. For example, in a case where the liquid crystal elastomer is heated up to a temperature at which a nematic phase is transformed into an isotropic phase of random alignment, a sample contracts in a director direction, and the contraction amount thereof increases along with a temperature increase, that is, the alignment degree of liquid crystal decreases. The deformation is thermoreversible, and the liquid crystal elastomer returns to its original shape in a case where it is cooled to the temperature of the nematic phase again.

On the other hand, in a case where the liquid crystal elastomer of the cholesteric phase is heated such that the alignment degree of liquid crystal decreases, the macroscopic elongational deformation of the helical axis direction occurs. Therefore, the helical pitch length decreases, and the reflection center wavelength of the selective reflection peak is shifted to a longer wavelength side. This change is also thermoreversible, and as the liquid crystal elastomer is cooled, the reflection center wavelength returns to a shorter wavelength side.

<<Refractive Index Ellipsoid of Cholesteric Liquid Crystal Layer>>

As described above, in the first region 20 of the cholesteric liquid crystal layer 16, the refractive index nx in the slow axis direction and the refractive index ny in the fast axis direction in the plane satisfy nx>ny. That is, in a case where the arrangement of the liquid crystal compounds 32 that are cholesterically aligned is seen from the helical axis direction, the first region 20 has the refractive index ellipsoid in which the angle between molecular axes of the adjacent liquid crystal compounds 32 gradually changes. In other words, in the cholesteric liquid crystal layer that satisfies nx>ny, that is, the cholesteric liquid crystal layer having the refractive index ellipsoid, the helical structure of the liquid crystal compound 32 forming the cholesteric liquid crystalline phase is distorted.

This way, the first region 20 selectively reflects the light components in the two distant wavelength ranges including: light in the wavelength range corresponding to the selective reflection center wavelength λ of the cholesteric liquid crystal layer 16, that is, light in a wavelength range of so-called primary light; and light in the wavelength range corresponding to the wavelength λ/2 that is (substantially) half of the selective reflection center wavelength λ, that is, light in a wavelength range of so-called secondary light.

In the following description, the light in the wavelength range corresponding to the selective reflection center wavelength λ will also be referred to as "primary light", and the light in the wavelength range corresponding to the wavelength λ/2 that is half of the selective reflection center wavelength λ will also be referred to as "secondary light".

Hereinafter, the refractive index ellipsoid will be described using FIGS. 4 and 5.

Figure 4:
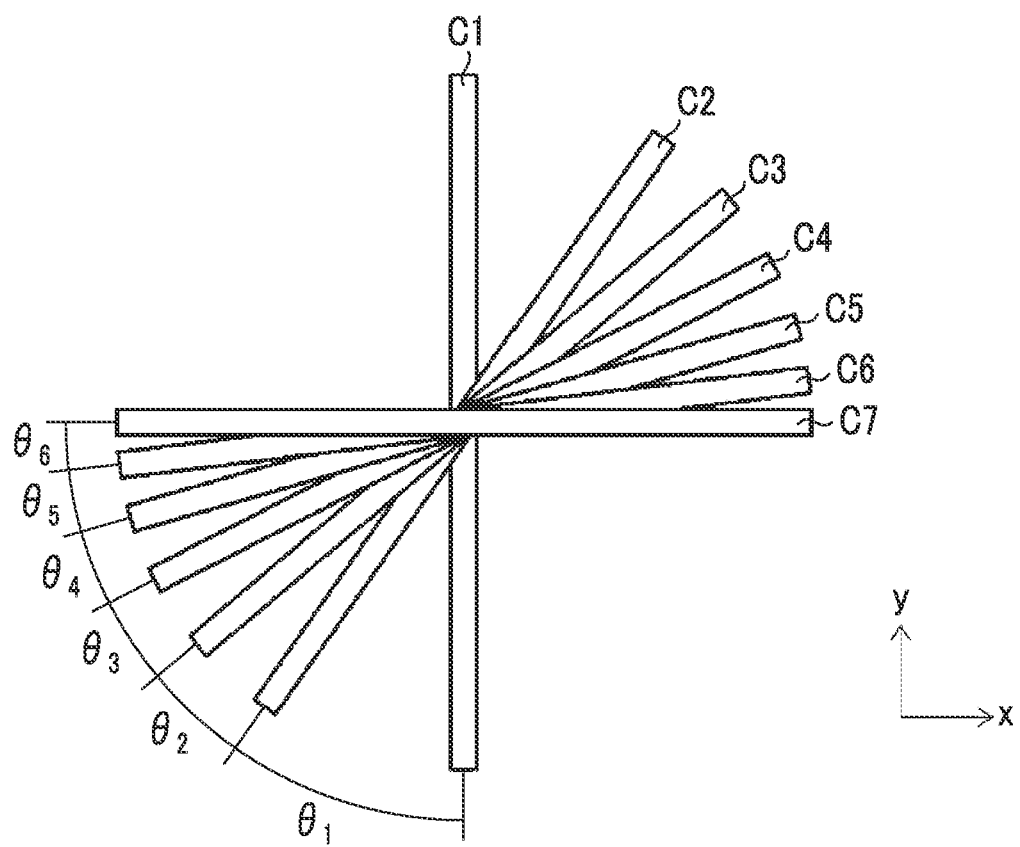
FIG. 4 is a diagram in a case where a part of a plurality of liquid crystal compounds that are twisted and aligned along a helical axis is seen from the helical axis direction.

FIG. 4 is a conceptual diagram showing a part (¼ pitch portion) of a plurality of liquid crystal compounds that are twisted and aligned along a helical axis in case of being seen from a helical axis direction (z direction). FIG. 5 is a conceptual diagram conceptually showing an existence probability of the liquid crystal compound seen from the helical axis direction.

In FIG. 4, a liquid crystal compound having a molecular axis parallel to the y direction is represented by C1, a liquid crystal compound having a molecular axis parallel to the x direction is represented by C7, and liquid crystal compounds between C1 and C7 are represented by C2 to C6 in order from the liquid crystal compound C1 side to the liquid crystal compound C7 side.

The liquid crystal compounds C1 to C7 are twisted and aligned along the helical axis, and the liquid crystal compound rotates by 90° from the liquid crystal compound C1 to the liquid crystal compound C7. In a case where the length between the liquid crystal compounds over which the angle of the liquid crystal compound that is twisted and aligned changes by 360° is set as 1 pitch ("P" in FIG. 2), the length between the liquid crystal compound C1 and the liquid crystal compound C7 is set as ¼ pitch.

As shown in FIG. 4, in the ¼ pitch from the liquid crystal compound C1 to the liquid crystal compound C7, the angle between the molecular axes of the liquid crystal compounds adjacent to each other in case of being seen from the helical axis direction varies.

In the example shown in FIG. 4, an angle $\theta_1$ between the liquid crystal compound C1 and the liquid crystal compound C2 is more than an angle $\theta_2$ between the liquid crystal compound C2 and the liquid crystal compound C3, the angle $\theta_2$ between the liquid crystal compound C2 and the liquid crystal compound C3 is more than an angle $\theta_3$ between the liquid crystal compound C3 and the liquid crystal compound C4, the angle $\theta_3$ between the liquid crystal compound C3 and the liquid crystal compound C4 is more than an angle $\theta_4$ between the liquid crystal compound C4 and the liquid crystal compound C5, the angle $\theta_4$ between the liquid crystal compound C4 and the liquid crystal compound C5 is more than an angle $\theta_5$ between the liquid crystal compound C5 and the liquid crystal compound C6, the angle $\theta_5$ between the liquid crystal compound C5 and the liquid crystal compound C6 is more than an angle $\theta_6$ between the liquid crystal compound C6 and the liquid crystal compound C7, and the angle $\theta_6$ between the liquid crystal compound C6 and the liquid crystal compound C7 is the smallest.

That is, the liquid crystal compounds C1 to C7 are twisted and aligned such that the angle between the molecular axes of the liquid crystal compounds adjacent to each other decreases in order from the liquid crystal compound C1 side toward the liquid crystal compound C7 side.

For example, in a case where the interval between the liquid crystal compounds (the interval in the thickness direction) is substantially regular, the rotation angle per unit length decreases in order from the liquid crystal compound C1 side to the liquid crystal compound C7 side in the ¼ pitch from the liquid crystal compound C1 to the liquid crystal compound C7.

In the cholesteric liquid crystal layer 16, the configuration in which the rotation angle per unit length changes as described above in the ¼ pitch is repeated such that the liquid crystal compound is twisted and aligned.

Here, in a case where the rotation angle per unit length is constant, the angle between the molecular axes of the liquid crystal compounds adjacent to each other is constant. Therefore, the existence probability of the liquid crystal compound in case of being seen from the helical axis direction is the same in any direction.

Figure 5:
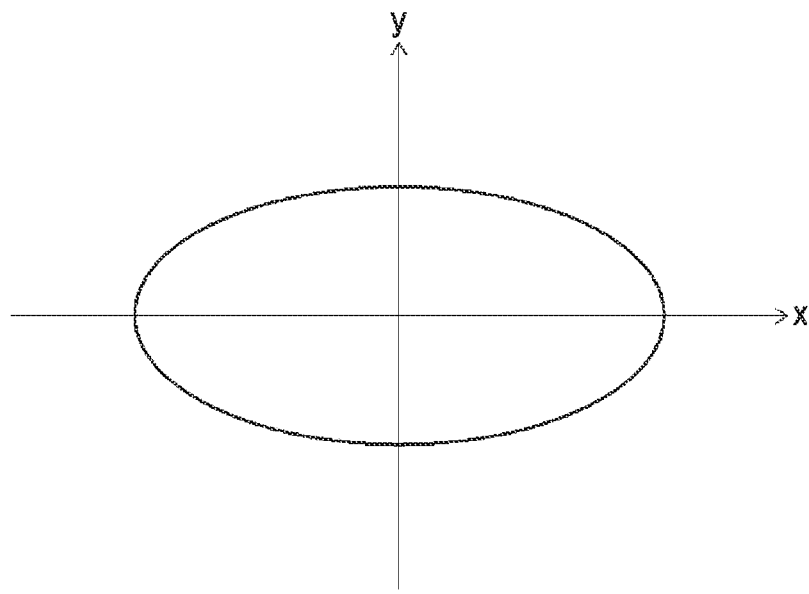
FIG. 5 is a diagram conceptually showing an existence probability of the liquid crystal compound seen from the helical axis direction in an optical element according to the present invention.

On the other hand, as described above, with the rotation angle per unit length decreases in order from the liquid crystal compound C1 side to the liquid crystal compound C7 side in the ¼ pitch from the liquid crystal compound C1 to the liquid crystal compound C7, the existence probability of the liquid crystal compound in case of being seen from the helical axis direction in the x direction is higher than that in the y direction as conceptually shown in FIG. 5. By making the existence probability of the liquid crystal compound to vary between the x direction and the y direction, the refractive index varies between the x direction and the y direction such that refractive index anisotropy occurs. In other words, refractive index anisotropy in plane perpendicular to the helical axis occurs.

The refractive index nx in the x direction in which the existence probability of the liquid crystal compound is higher is higher than the refractive index ny in the y direction in which the existence probability of the liquid crystal compound is lower. Accordingly, the refractive index nx and the refractive index ny satisfy nx>ny.

The x direction in which the existence probability of the liquid crystal compound is higher is the in-plane slow axis direction of the cholesteric liquid crystal layer 16, and the y direction in which the existence probability of the liquid crystal compound is lower is the in-plane fast axis direction of the cholesteric liquid crystal layer 16.

This way, the configuration (the configuration having the refractive index ellipsoid) in which the rotation angle per unit length in the ¼ pitch change in the twisted alignment of the liquid crystal compound can be formed by applying a composition for forming the cholesteric liquid crystal layer and irradiating the cholesteric liquid crystalline phase (composition layer) with polarized light in a direction perpendicular to the helical axis.

That is, during the formation of the cholesteric liquid crystal layer 16, the irradiation of the polarized light is performed using the mask having the opening (light transmission part) corresponding to the first region 20.

During the formation of the cholesteric liquid crystal layer 16, in order to form the PG structure before the irradiation of polarized light for forming the refractive index ellipsoid, the light irradiation (ultraviolet irradiation) for changing the HTP of the chiral agent is performed as described above.

The cholesteric liquid crystalline phase can be distorted by polarized light irradiation to cause in-plane retardation to occur. That is, the relationship between the refractive index nx in the slow axis direction and the refractive index ny in the fast axis direction can satisfy nx>ny.

Specifically, the polymerization of the liquid crystal compound having a molecular axis in a direction that matches a polarization direction of irradiated polarized light progresses. At this time, only a part of the liquid crystal compound is polymerized. Therefore, a chiral agent present at this position is excluded and moves to another position.

Accordingly, at a position where the direction of the molecular axis of the liquid crystal compound is close to the polarization direction, the amount of the chiral agent decreases, and the rotation angle of the twisted alignment decreases. On the other hand, at a position where the direction of the molecular axis of the liquid crystal compound is perpendicular to the polarization direction, the amount of the chiral agent increases, and the rotation angle of the twisted alignment increases.

As a result, as shown in FIG. 4, the liquid crystal compound that is twisted and aligned along the helical axis can be configured such that, in the ¼ pitch from the liquid crystal compound having the molecular axis parallel to the polarization direction to the liquid crystal compound having the molecular axis perpendicular to the polarization direction, the angle between the molecular axes of the liquid crystal compounds adjacent to each other decreases in order from the liquid crystal compound side parallel to the polarization direction to the liquid crystal compound side perpendicular to the polarization direction. That is, by irradiating the cholesteric liquid crystalline phase with polarized light, the existence probability of the liquid crystal compound varies between the x direction and the y direction, the refractive index varies between the x direction and the y direction such that refractive index anisotropy occurs. As a result, the refractive index nx and the refractive index ny of the reflective sheet 10 can satisfy nx>ny. That is, the cholesteric liquid crystal layer can adopt the configuration having the refractive index ellipsoid.

This polarized light irradiation may be performed at the same time as the immobilization of the cholesteric liquid crystalline phase, the immobilization may be further performed by non-polarized light irradiation after the polarized light irradiation, and photo-alignment may be performed by polarized light irradiation after performing the immobilization by non-polarized light irradiation. In order to obtain high retardation, it is preferable that only polarized light irradiation is performed or polarized light irradiation is performed in advance. It is preferable to perform the polarized light irradiation in an inert gas atmosphere where the oxygen concentration is 0.5% or less.

The irradiation energy of the polarized light is not particularly limited and is preferably 20 mJ/cm$^2$ to 10 J/cm$^2$ and more preferably 100 to 800 mJ/cm$^2$. The illuminance of the polarized light to be irradiated is preferably 20 to 1000 mW/cm$^2$, more preferably 50 to 500 mW/cm$^2$, and still more preferably 100 to 350 mW/cm$^2$.

The kind of the liquid crystal compound to be cured by polarized light irradiation is not particularly limited, and a liquid crystal compound having an ethylenically unsaturated group as a reactive group is preferable.

By increasing the intensity of the polarized light irradiation, a change in the angle between the molecular axes of the liquid crystal compounds 32 increases. That is, by increasing the intensity of the polarized light irradiation, the distortion of the helical structure of the cholesteric liquid crystalline phase with respect to a typical helical structure increases.

As a result, a difference between the refractive index nx and the refractive index ny of the optical element increases, and the reflectivity of the secondary light described below, that is, the light intensity of the secondary light increases. That is, in the optical element according to the embodiment of the present invention, as the distortion of the cholesteric liquid crystalline phase increases, the diffraction efficiency of the secondary light increases.

The adjustment of the intensity of the polarized light irradiation may be performed by performing the adjustment of the irradiation energy of polarized light to be irradiated, the adjustment of the illuminance of polarized light to be irradiated, the adjustment of the irradiation time of polarized light, and the like.

In addition, examples of a method of distorting the cholesteric liquid crystalline phase by polarized light irradiation to cause in-plane retardation to occur include a method using a dichroic liquid crystalline polymerization initiator (WO2003/054111A1) and a method using a rod-like liquid crystal compound having a photo-alignable functional group such as a cinnamoyl group in the molecule (JP2002-6138A).

The light to be irradiated may be ultraviolet light, visible light, or infrared light. That is, the light with which the liquid crystal compound is polymerizable may be appropriately selected depending on the liquid crystal compound including a coating film, the polymerization initiator, and the like.

In a case where the composition layer is irradiated with polarized light by using the dichroic radical polymerization initiator as the polymerization initiator, the polymerization of the liquid crystal compound having a molecular axis in a direction that matches the polarization direction can be more suitably made to progress.

The slow axis direction, the fast axis direction, the refractive index nx, and the refractive index ny in the plane of the cholesteric liquid crystal layer 16 can be measured, for example, using M-2000 UI (manufactured by J. A. Woollam Co., Ltd.) as a spectroscopic ellipsometer. The refractive index nx and the refractive index ny can be obtained from a measured value of a retardation $\Delta n \times d$ using measured values of an average refractive index $n_{ave}$ and a thickness d. Here, $\Delta n = nx - ny$, and the average refractive index $n_{ave} = (nx+ny)/2$. In general, since the average refractive index of liquid crystal is about 1.5, nx and ny can be obtained using this value.

In addition, in-plane slow axis direction, the fast axis direction, the refractive index nx, and the refractive index ny of the cholesteric liquid crystal layer used in the present invention are measured, a longer wavelength than the selective reflection center wavelength λ is the measurement wavelength. As a result, the influence of retardation derived from the cholesteric selective reflection on a rotary polarization component is reduced as far as possible. Therefore, the measurement can be performed with high accuracy. The selective reflection center wavelength λ corresponds to the primary light. In addition, the wavelength of the measurement light is, for example, a wavelength 100 nm longer than that of a longer wavelength side end part of the reflection wavelength range including the selective reflection center wavelength λ of the cholesteric liquid crystal layer.

In addition, the cholesteric liquid crystal layer having the refractive index ellipsoid where the refractive indices satisfy nx>ny can be formed by stretching the cholesteric liquid crystal layer after applying the composition for forming the cholesteric liquid crystal layer, after immobilizing the cholesteric liquid crystalline phase, or in a state where the cholesteric liquid crystalline phase is semi-immobilized.

In a case where the cholesteric liquid crystal layer having the refractive index ellipsoid is formed by stretching, the stretching may be monoaxial stretching or biaxial stretching. In addition, stretching conditions may be appropriately set depending on the material, the thickness, the desired refractive index nx, and the desired refractive index ny of the cholesteric liquid crystal layer. In the case of monoaxial stretching, the stretching ratio is preferably 1.1 to 4. In the case of biaxial stretching, a ratio between the stretching ratio of one stretching direction and the stretching ratio of another stretching direction is preferably 1.1 to 2.

<<Action of Cholesteric Liquid Crystal Layer having Refractive Index Ellipsoid>>

An action of the cholesteric liquid crystal layer (optical element) having the Refractive index ellipsoid, that is, the first region 20 of the cholesteric liquid crystal layer 16 will be described below in detail.

In a case where the light corresponding to the selective reflection center wavelength $\lambda$ (primary light) is incident into the cholesteric liquid crystal layer, the light is reflected by the cholesteric liquid crystal layer.

Here, in a case where the cholesteric liquid crystal layer has the refractive index ellipsoid, the cholesteric liquid crystal layer selectively reflects not only the light (primary light) in the wavelength range corresponding to the selective reflection center wavelength $\lambda$ but also the light (secondary light) in the wavelength range corresponding to the wavelength $\lambda/2$.

The reflection center wavelength (peak wavelength of reflection) of the secondary light is the length ($\lambda/2$) that is substantially half of the selective reflection center wavelength $\lambda$ of the primary light. In addition, the reflection wavelength range (half-width) of the secondary light is less than the reflection wavelength range of the primary light. In addition, although the primary light is any of right circularly polarized light or left circularly polarized light depending on the turning direction of the cholesteric liquid crystalline phase, the secondary light includes both components of right circularly polarized light and left circularly polarized light.

Figure 6:
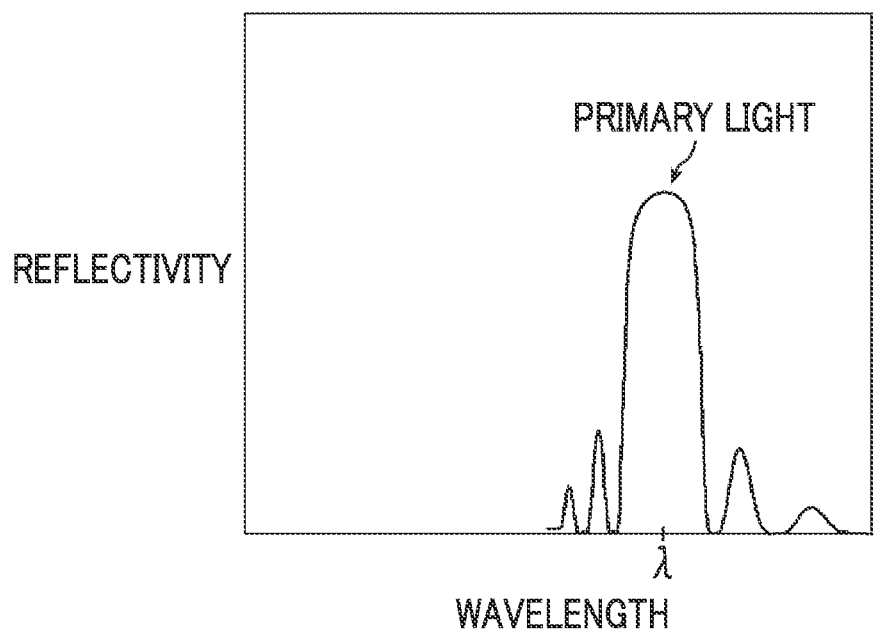
FIG. 6 is a graph conceptually showing an example of light reflectivity of a typical cholesteric liquid crystal layer.
Figure 7:
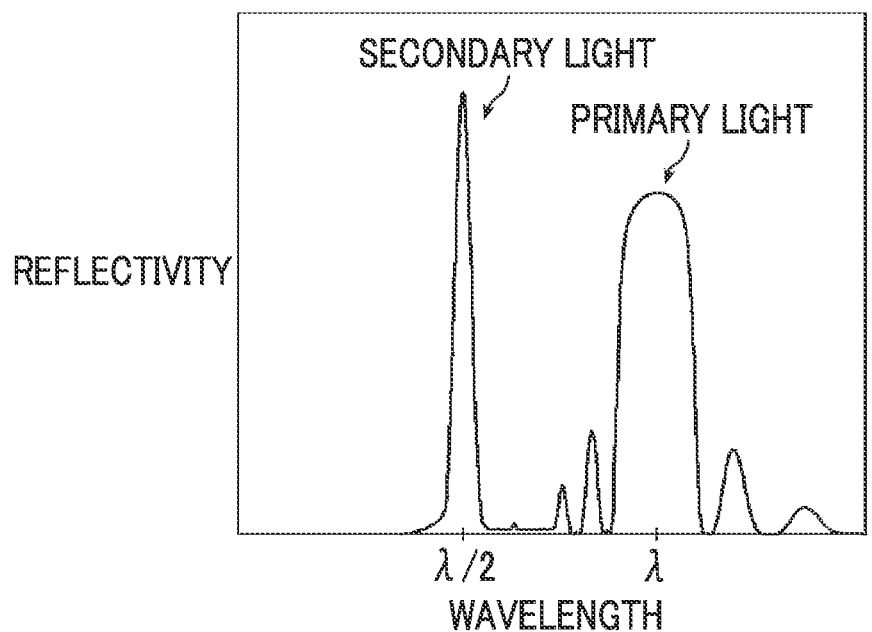
FIG. 7 is a graph conceptually showing an example of light reflectivity of a cholesteric liquid crystal layer having a refractive index ellipsoid.

FIG. 6 conceptually shows reflection characteristics of a general cholesteric liquid crystal layer not having an refractive index ellipsoid. FIG. 6 and FIG. 7 shown below are graphs conceptually showing reflection characteristics in which the horizontal axis represents a wavelength and the vertical axis represents a reflectivity as a reflection characteristic of the cholesteric liquid crystal layer.

The general cholesteric liquid crystal layer has wavelength selectivity in reflection, and thus reflects light in a wavelength range near the selective reflection center wavelength $\lambda$ at a substantially uniformly high reflectivity as shown in FIG. 6. In addition, in the general cholesteric liquid crystal layer, the reflectivity with respect to light in a wavelength range other than the vicinity of the wavelength $\lambda$ as the selective reflection center wavelength is low.

On the other hand, as conceptually shown in FIG. 7, the cholesteric liquid crystal layer has the refractive index ellipsoid reflects, with high reflectivity, not only the light (primary light) in the wavelength range corresponding to the selective reflection center wavelength $\lambda$ but also the light (secondary light) in the wavelength range corresponding to the wavelength $\lambda/2$.

As shown in FIG. 7, the half-width of the second selective reflection peak at the wavelength $\lambda/2$ is narrower than the half-width of the first selective reflection peak at the wavelength $\lambda$.

As described above, in the reflective sheet 10 in the example shown in the drawing, the cholesteric liquid crystal layer 16 includes the first region 20 and the second region 24.

The second region 24 is a region consisting of the typical cholesteric liquid crystalline phase where the refractive index nx in the slow axis direction and the refractive index ny in the fast axis direction satisfy nx=ny. Accordingly, the second region 24 selectively reflects only the light (primary light) in the wavelength range corresponding to the selective reflection center wavelength $\lambda$.

On the other hand, the first region 20 is a region having the refractive index ellipsoid where the refractive index nx in the slow axis direction and the refractive index ny in the fast axis direction satisfy nx>ny. Accordingly, the first region 20 selectively reflects not only the light (primary light) in the wavelength range corresponding to the selective reflection center wavelength $\lambda$ but also the light (secondary light) in the wavelength range corresponding to the wavelength $\lambda/2$.

Accordingly, in a case where the light in the wavelength range of the primary light corresponding to the selective reflection center wavelength $\lambda$ is incident into the reflective sheet 10, the incidence light is reflected (specular reflection) by both of the first region 20 and the second region 24, that is, the entire surface.

On the other hand, in a case where the light in the wavelength range of the secondary light corresponding to the wavelength $\lambda/2$ is incident into the reflective sheet 10, the light is reflected by only the first region 20 without being reflected by the second region 24.

Figure 8:
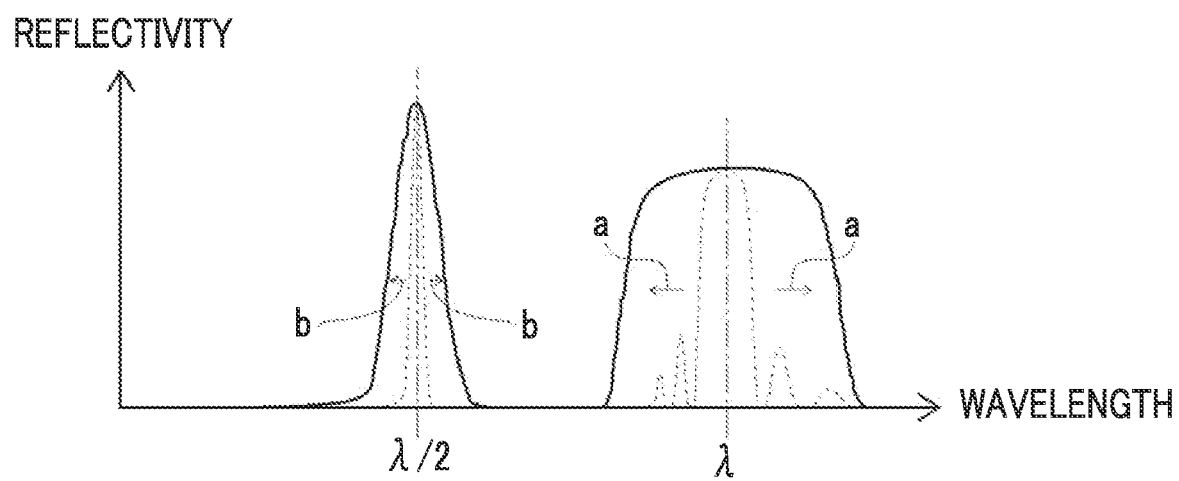
FIG. 8 is a graph conceptually showing an example of reflection characteristics of the cholesteric liquid crystal layer of the optical element according to the present invention.

Here, in the cholesteric liquid crystal layer having the refractive index ellipsoid, as indicated by a broken line in FIG. 8, typically, the secondary light corresponding to the second wavelength $\lambda/2$ has a significantly narrower bandwidth of reflection wavelength than the primary light corresponding to the selective reflection center wavelength $\lambda$.

Incidentally, light may be incident into the reflective sheet 10 at various angles.

In addition, as is well known, in a case where light is incident into the cholesteric liquid crystal layer (cholesteric liquid crystalline phase) with an angle with respect to a normal line of a main surface (maximum surface), so-called blue shift in which a selective reflection wavelength range is shifted to a shorter wavelength side occurs.

Therefore, in the first region 20, the secondary light having a significantly narrow bandwidth of reflection wavelength can be reflected only when the light in a significantly narrow wavelength range is incident in a significantly narrow angle range from the front.

On the other hand, in the optical element according to the embodiment of the present invention, that is, the reflective sheet 10, the cholesteric liquid crystal layer 16 has not only the refractive index ellipsoid but also the PG structure.

As described above, the PG structure is a structure where the helical pitch of the cholesteric liquid crystalline phase gradually changes in the thickness direction of the cholesteric liquid crystal layer. In the example shown in the drawing, the PG structure where the helical pitch P of the cholesteric liquid crystalline phase gradually increases in the direction away from the support 12 (alignment film 14) is provided.

As described above, the selective reflection wavelength of the cholesteric liquid crystal layer depends on the helical pitch P of the cholesteric liquid crystalline phase, and as the helical pitch increases, the wavelength of light to be selectively reflected increases.

For example, the reflection wavelength range of the primary light corresponding to the selective reflection center wavelength $\lambda$ that is reflected by the cholesteric liquid crystal layer having the PG structure where the helical pitch gradually changes is wider for example, by the amount of arrow a than the cholesteric liquid crystal layer not having the PG structure indicated by a broken line in FIG. 8.

Further, according to the investigation by the present inventors, the cholesteric liquid crystal layer having the refractive index ellipsoid further has the PG structure such that, as indicated by a broken line in FIG. 8, the reflection wavelength ranges of not only the primary light corresponding to the selective reflection center wavelength $\lambda$ but also the secondary light corresponding to the wavelength $\lambda/2$ are widened, for example, by the amount of arrow b as compared to the cholesteric liquid crystal layer not having the PG structure indicated by the broken line.

Therefore, not only the primary light corresponding to the selective reflection center wavelength $\lambda$ but also the secondary light corresponding to $\lambda/2$ that is substantially half of the wavelength can be suitably reflected depending on various incidence directions of light.

Accordingly, in the reflective sheet 10, depending on the formation pattern of the first region 20, the patterning of reflection by the total reflection of the primary light and the partial reflection of the secondary light can be performed on light incident from various directions.

That is, in the reflective sheet 10, the primary light corresponding to the selective reflection center wavelength $\lambda$ is reflected by the entire surface of the cholesteric liquid crystal layer 16, and the secondary light corresponding to the wavelength $\lambda/2$ is reflected by only the first region 20. Accordingly, in the reflective sheet 10 (optical element), the patterning of reflection can be performed by performing the exposure through the mask having the opening corresponding to the first region, and the reflective sheet 10 can be used for various applications.

For example, in the reflective sheet 10, the secondary light, that is, the selective reflection center wavelength $\lambda$ of the cholesteric liquid crystal layer is the wavelength range of invisible light, for example, infrared light. On the other hand, the secondary light, that is, the wavelength $\lambda/2$ is a wavelength range of visible light such as red light or green light. In the reflective sheet 10, visible light is reflected by only the first region 20. Therefore, the reflective sheet 10 can be suitably used for a brightness homogenizing sheet in a backlight unit or the like.

The PG structure of the cholesteric liquid crystal layer 16 can be formed by performing the light irradiation for changing the HTP of the chiral agent before aligning the liquid crystal compound to the cholesteric liquid crystalline phase using the chiral agent where the HTP changes by light irradiation as described above.

As the chiral agent in which the HTP changes by light irradiation, a general chiral agent where the HTP decreases by light irradiation can be used. In addition, for example, the light irradiation for changing the HTP of the chiral agent is performed from the side opposite to the support 12, that is, from the upper side in FIG. 2 such that there is no influence of the support 12 or the like.

The light that is irradiated for changing the HTP of the chiral agent is absorbed by the component in the liquid crystal composition for forming the cholesteric liquid crystal layer 16, in particular, by the chiral agent.

Accordingly, the irradiation dose of light on the cholesteric liquid crystal layer 16 (liquid crystal composition) gradually decreases from the upper side (the side opposite to the support 12) to the lower side (the support 12 side). Therefore, a decrease in the HTP of the chiral agent by light irradiation gradually decreases from the upper side to the lower alignment film 14 side.

As a result, on the upper side where the decrease in the HTP of the chiral agent is large, the induction of helix is small, and thus the helical pitch increases. On the other hand, on the lower side where the decrease in the HTP of the chiral agent is small, helix is induced by the original HTP of the chiral agent, and thus the helical pitch decreases.

Accordingly, in the example, in the cholesteric liquid crystal layer 16, the helical pitch of the cholesteric liquid crystalline phase is gradually widened from the lower side to the upper side.

The light irradiation for changing the HTP of the chiral agent may be performed using light having a wavelength for which the chiral agent has an absorption. It is preferable to perform ultraviolet irradiation.

During the formation of the cholesteric liquid crystal layer 16, in order to promote the change of the HTP of the chiral agent, it is preferable that ultraviolet irradiation is performed after heating. The liquid crystal composition may be heated to align the liquid crystal compound to a cholesteric liquid crystalline phase.

In order to prevent the cholesteric liquid crystalline phase from being disordered, it is preferable that the temperature during the ultraviolet irradiation is maintained in a temperature range where the cholesteric liquid crystalline phase is exhibited. Specifically, the temperature during the ultraviolet irradiation is preferably 25° C. to 140° C. and more preferably 30° C. to 100° C.

During the ultraviolet irradiation for promoting the change of the HTP of the chiral agent, the oxygen concentration is not particularly limited. Accordingly, the ultraviolet irradiation may be performed in an oxygen atmosphere or in a low oxygen atmosphere.

In the reflective sheet 10, that is, the optical element according to the embodiment of the present invention, the half-width (full width at half maximum) of the reflection wavelength range of the secondary light corresponding to the wavelength $\lambda/2$ in the cholesteric liquid crystal layer 16 having the PG structure is not limited and may be appropriately set, for example, depending on the application of the reflective sheet 10.

For example, from the viewpoint that the wavelength range of light to be reflected corresponding to the wavelength $\lambda/2$ can be sufficiently widened, the half-width of the reflection wavelength range of the secondary reflected light is preferably 100 nm or more, more preferably 200 nm or more, and still more preferably 300 nm or more.

The half-width of the reflection wavelength range of the secondary reflected light (primary reflected light) may be adjusted, for example, depending on the kind of the chiral agent to be used, the brightness of light to be irradiated for changing the HTP of the chiral agent, the irradiation time of light to be irradiated for changing the HTP of the chiral agent, and the like.

In the optical element according to the embodiment of the present invention, as described above, the reflection intensity (reflectivity) of the secondary light can be increased by increasing a change in the angle between the molecular axes of the liquid crystal compounds 32 in the cholesteric liquid crystal layer having the refractive index ellipsoid, that is, the distortion of the helical structure of the cholesteric liquid crystalline phase.

In the reflective sheet 10 in the example shown in the drawing, the shape (planar shape) of the first region 20 in the cholesteric liquid crystal layer 16 is circular. However, the present invention is not limited to this configuration, and the first region 20 can adopt various shapes.

For example, the shape of the first region 20 may be a polygonal shape such as a triangular shape, a quadrangular shape, or a hexagonal shape, may be an ellipsoid, may be a shape copying any object such as a star shape, or may be an unstructured shape.

In addition, the positions and the arrangement of the first regions 20 may be regular or irregular.

Further, in the reflective sheet 10 in the example shown in the drawing, the first regions 20 where the refractive indices satisfy nx>ny are scattered in the second region 24 as the typical cholesteric liquid crystalline phase where the refractive indices satisfy nx=ny. The present invention is not limited to this configuration. That is, in the reflective sheet (optical element) according to the embodiment of the present invention, contrary to the reflective sheet 10 in the example shown in the drawing, the second regions as the typical cholesteric liquid crystalline phase where the refractive indices satisfy nx=ny may be scattered in the first region where the refractive indices satisfy nx>ny.

In addition, the reflective sheet (optical element) according to the embodiment of the present invention is not also limited to the configuration in which the first regions (second regions) where the refractive indices satisfy nx>ny are scattered in the second region 24 as the typical cholesteric liquid crystalline phase where the refractive indices satisfy nx=ny.

For example, in the reflective sheet according to the embodiment of the present invention, the entire surface of the cholesteric liquid crystal layer may be the first region where the refractive indices satisfy nx>ny.

In addition, in the reflective sheet according to the embodiment of the present invention, a rectangular and circular shape may be equally divided into two regions such that one of the regions is the first region where the refractive indices satisfy nx>ny and the remaining region is the second region as the typical cholesteric liquid crystalline phase where the refractive indices satisfy nx=ny. The rectangular and circular shape may be equally divided into four regions such that the first region and the second region are alternately provided. Alternatively, in the reflective sheet according to the embodiment of the present invention, a circular shape may be equally divided in a circumferential direction into regions, for example, on a 60° basis of rotation angle such that the first region and the second region are alternately provided. The cholesteric liquid crystal layer may be divided into regions in a concentric circular shape such that the first region and the second region are alternately provided. Alternately, in the reflective sheet according to the embodiment of the present invention, the cholesteric liquid crystal layer may be formed in a check pattern such that the first region and the second region are alternately provided. Further, in the reflective sheet according to the embodiment of the present invention, the first region and the second region may be provided such that the first region and the second region continuously change to be connected.

That is, in the reflective sheet according to the embodiment of the present invention, in a case where cholesteric liquid crystal layer includes the first region where the refractive indices satisfy nx>ny and the second region as the typical cholesteric liquid crystalline phase where the refractive indices satisfy nx=ny, The arrangement positions (arrangement) of the first region and the second region can adopt various configurations depending on the application of the reflective sheet.

Optionally, the reflective sheet (optical element) according to the embodiment of the present invention may include two or more cholesteric liquid crystal layers described above.

In a case where the optical element includes two or more cholesteric liquid crystal layers, helical pitches of cholesteric liquid crystalline phases of the cholesteric liquid crystal layers can be set to be different from each other such that selective reflection wavelengths are different from each other.

That is, with the configuration in which the optical element includes two or more cholesteric liquid crystal layers having different selective reflection wavelengths, for example, the reflective sheet 10 can selectively display light components (four or more colors) having four or more different central wavelengths.

In addition, in a case where the optical element includes two or more cholesteric liquid crystal layers, the helical turning directions of the cholesteric liquid crystalline phases may be different from each other.

As a result, in the primary light corresponding to the selective reflection center wavelength λ, both of right circularly polarized light and left circularly polarized light can be reflected.

In the above-described example, the optical element according to the embodiment of the present invention is used for the reflective sheet. However, the present invention is not limited to this example. That is, the optical element according to the embodiment of the present invention can selectively reflect the light components in different discontinuous wavelength ranges including the primary light corresponding to the selective reflection center wavelength λ and the secondary light corresponding to the wavelength λ/2, and can be used for various applications utilizing the fact that the patterning of reflection of the secondary light can be performed.

For example, the optical element according to the embodiment of the present invention can be suitably used for a decorative sheet or the like.

In any decorative sheet including the optical element according to the embodiment of the present invention, the color or reflected light and the reflected part of light can change depending on incidence light.

Hereinabove, the optical element and the reflective sheet according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Alignment Film)

A glass substrate was used as the support.

The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film P-1 was formed.

—Coating Liquid for Forming Alignment Film—

| | |
|---|---|
| The following material for photo-alignment | 1.00 part by mass |
| Water | 16.00 parts by mass |

-continued

| | |
|---|---|
| Butoxyethanol | 42.00 parts by mass |
| Propylene glycol monomethyl ether | 42.00 parts by mass |

—Material for Photo-Alignment—

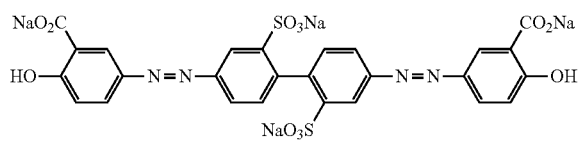

(Exposure of Alignment Film)

By irradiating the obtained alignment film P-1 with polarized ultraviolet light (50 mJ/cm$^2$, using an extra high pressure mercury lamp), the alignment film was exposed.

(Formation of Cholesteric Liquid Crystal Layer)

As the liquid crystal composition forming the cholesteric liquid crystal layer, the following liquid crystal composition LC-1 was prepared. The photopolymerization initiator (LC-1-1) was synthesized using a method described in EP1388538A1, page 21.

—Liquid Crystal Composition LC-1—

| | |
|---|---|
| Liquid crystal compound L-1 | 100.00 parts by mass |
| Photopolymerization initiator (LC-1-1) | 3.5 parts by mass |
| Photosensitizer (KAYACURE DETX-S, manufactured by Nippon Kayaku Co., Ltd.) | 1.00 part by mass |
| Chiral agent Ch-3 | 2.0 parts by mass |
| Methyl ethyl ketone | 330.60 parts by mass |

Liquid crystal compound L-1 (including the following structures at a mass ratio shown on the right side)

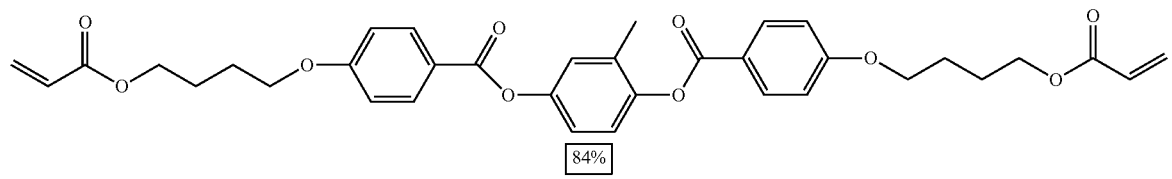

84%

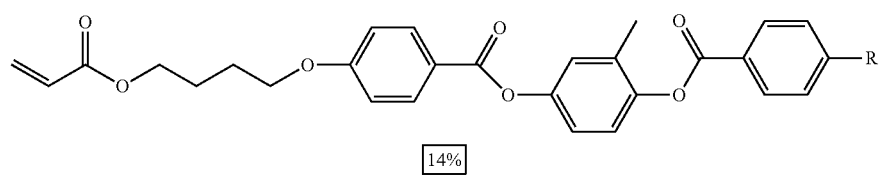

14%

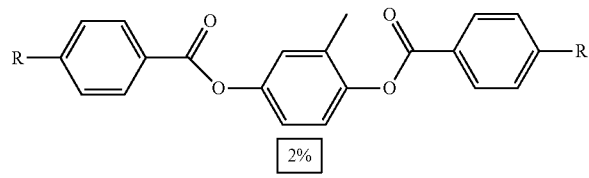

2%

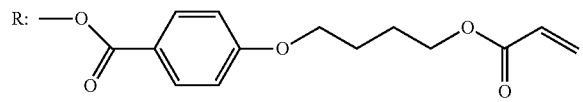

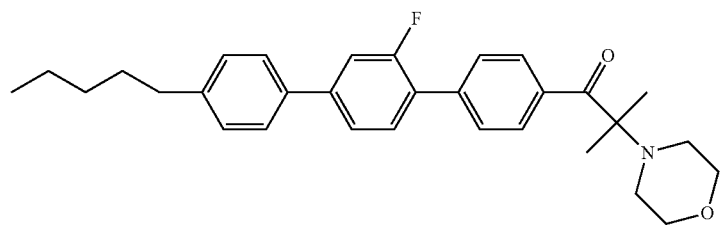

(LC-1-1)

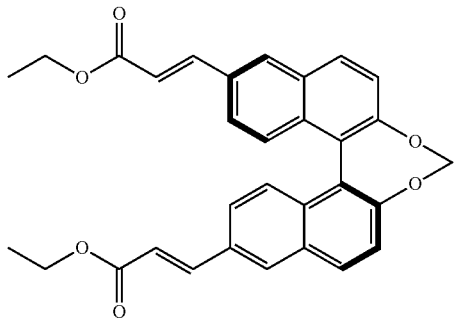

Chiral Agent Ch-3

The phase transition temperature of the liquid crystal compound L-1 was obtained by heating the liquid crystal compound on a hot plate and observing the texture with a polarization microscope. As a result, the crystal-nematic phase transition temperature was 79° C., and the nematic-isotropic phase transition temperature was 144° C.

In addition, Δn of the liquid crystal compound L-1 was measured by pouring the liquid crystal compound into a wedge cell, emitting laser light having a wavelength of 550 nm, and measuring the refraction angle of the transmitted light. The measurement temperature was 60° C. Δn of the liquid crystal compound L-1 was 0.16.

The above-described liquid crystal composition LC-1 was applied to the alignment film P-1 using a spin coater at 800 rpm for 10 seconds.

The coating film of the liquid crystal composition LC-1 was heated on a hot plate at 80° C. for 3 minutes.

Next, in a first exposure step, the liquid crystal composition LC-1 was exposed using a high-pressure mercury lamp at 100° C. through a long pass filter of 300 nm and a short pass filter of 350 nm (first exposure step). The first exposure step was performed such that the light irradiation dose measured at a wavelength of 315 nm was 30 mJ/cm$^2$.

Next, the liquid crystal composition LC-1 was irradiated with polarized UV through the following exposure mask by using, as a ultraviolet (UV) light source, a polarized UV irradiation device including a combination of a microwave-powered ultraviolet irradiation device (Light Hammer 10, 240 W/cm, Fusion UV systems GmbH) on which D-bulb having a strong emission spectrum in 350 to 400 nm was mounted and a wire grid polarization filter (ProFlux PPL02 (high transmittance type), manufactured by Moxtek, Inc.) (second exposure step).

The wire grid polarization filter was disposed at a position 10 cm distant from the emission surface.

The irradiation of the polarized UV was performed at an illuminance of 200 mW/cm$^2$ and an irradiation dose of 600 mJ/cm$^2$ in a nitrogen atmosphere where the oxygen concentration was 0.3% or less.

In addition, the polarized UV was irradiated in a direction parallel to the polarization direction of the polarized ultraviolet light during the exposure of the alignment film.

In the second exposure step, in order to provide the exposure mask, in a 100×100 mm retardation film having an in-plane retardation of about 95 nm, holes having a diameter of 1.5 mm were arranged in a 30 by 30 array to be spaced from each other at intervals (inter-center distances) of 3 mm, and the retardation film was bonded to glass.

By performing the exposure through the exposure mask, a liquid crystal composition patterning diffusion plate capable of position-selectively diffusing light of a white LED as a backlight unit described below was able to be formed. By shifting the slow axis of the retardation film by 45° from the polarization direction of the polarized UV, the polarized UV was able to be converted into circularly polarized light having a specific polarization direction.

The cholesteric liquid crystalline phase was immobilized by performing the second exposure step using the exposure mask, the liquid crystal composition LC-1 in the holes of the retardation film was irradiated with the polarized UV as it is, and the liquid crystal composition LC-1 in portions of the retardation film other than the holes was irradiated with the circularly polarized light. As a result, a film was prepared where a refractive index nx in a slow axis direction and a refractive index ny in a fast axis direction in a plane only in the holes of the retardation film satisfied nx>ny such that λ/2 light was reflected.

Accordingly, this film was a film including a cholesteric liquid crystal layer that was patterned such that λ/2 light was reflected at intervals of 3 mm.

(Evaluation of Film)

Regarding the prepared film, the slow axis direction, the fast axis direction, the refractive index nx, and the refractive index ny were measured using M-2000 UI (manufactured by J. A. Woollam Co., Ltd.) as a spectroscopic ellipsometer. As a result, it was verified that nx>ny was satisfied in the patterned portions at intervals of 3 mm, and nx=ny was satisfied in portions between the patterned portions.

In a case where the reflectivity of the prepared film was measured, in both of the patterned center portions at intervals of 3 mm and the portions between the patterned portions, a reflecting region having a central wavelength of 1100 nm and having a width of about 400 nm was verified. The reason for this is presumed to be that, since the HTP of the chiral agent was distributed with a deviation in the thickness direction in the first exposure step, a distribution (PG structure) was generated in the helical pitch of the cholesteric liquid crystalline phase in the thickness direction, and reflected light had a distribution in wavelength.

Further, only in the patterned center portions at intervals of 3 mm, a reflecting region having a central wavelength of 550 nm and having a width of about 200 nm was verified. The reason for this is presumed to be as follows. In the second exposure step, the twist of the liquid crystal compound in the cholesteric liquid crystalline phase had a deviation in the plane direction (in-plane direction) (the alignment distribution increased depending on the polarization direction of the polarized light exposure). As a result, the refractive index nx in the slow axis direction and the refractive index ny in the fast axis direction in the plane satisfied nx>ny, and reflected light was generated in the wavelength range that was half of the wavelength range of the above-described reflected light.

<Preparation of Backlight Unit for Evaluation>

On a glass epoxy substrate having a size of 100 mm×100 mm, white LEDs were arranged and mounted in a 30 by 30 array at intervals (inter-center distances) of 3 mm to prepare a substrate for evaluation.

During the mounting, a white solder resist was used. After the mounting, a silicone resin was applied to the substrate to form a transparent protective layer having a thickness of 0.3 mm.

A diffusion plate (AROMA-BRIGHT KT-1070B, manufactured by Nippon Polyester Co., Ltd.) having a thickness of 1 mm and having one smooth surface and one mat surface was disposed on the substrate where the transparent protective layer was formed, and the film according to Example 1 was transferred to the surface thereof.

The transfer was performed by bonding the prepared film to the diffusion plate through an OCA (SK2057, manufactured by Soken Chemical & Engineering Co., Ltd.) and peeling off the temporary support.

In addition, in Comparative Example 1, the above-described diffusion plate to which the film according to Example 1 was not transferred was prepared.

In Example 1, the centers of the reflection patterned portions of the film were aligned to overlap the centers (optical axes) of the LED light sources of the substrate, and the diffusion plate to which the cholesteric film was transferred was disposed to face the light source and the cholesteric film.

In Comparative Example 1, the diffusion plate was disposed without performing the alignment.

On the diffusion plate (opposite to the light source), two prism sheets (BEF2-T-155n, manufactured by 3M) and a reflective polarizer layer (DBEF-D2-400, manufactured by 3M) were disposed in this order to prepare a backlight unit for evaluation. The two prism sheets were disposed such that linear prism arrays were perpendicular to each other.

[Evaluation of Brightness Uniformity]

The prepared backlight unit was observed by visual inspection from the front to evaluate brightness uniformity. The uniformity was evaluated and determined based on the following standards.

A: lattice-shaped unevenness in brightness was not observed.

B: lattice-shaped unevenness in brightness was observed but was allowable.

C: lattice-shaped unevenness in brightness was clearly observed and was not allowable.

As a result of the evaluation, Example 1 was evaluated as A, whereas Comparative Example 1 was evaluated as C.

As can be seen from the above results, the effects of the present invention are obvious.

EXPLANATION OF REFERENCES

10: reflective sheet
12: support
14: alignment film
16: cholesteric liquid crystal layer
20: first region
24: second region
32: liquid crystal compound

What is claimed is:

1. An optical element comprising:
a cholesteric liquid crystal layer obtained by cholesterically aligning a liquid crystal compound,
wherein the cholesteric liquid crystal layer has a region where a refractive index nx in a slow axis direction and a refractive index ny in a fast axis direction in a plane satisfy nx>ny,
a helical axis of the cholesteric alignment is parallel to a thickness direction of the cholesteric liquid crystal layer, and
a helical pitch in the cholesteric alignment gradually changes in the thickness direction of the cholesteric liquid crystal layer.

2. The optical element according to claim 1,
wherein the cholesteric liquid crystal layer has a peak of reflection at a selective reflection center wavelength λ and a wavelength λ/2,
the selective reflection center wavelength λ is a wavelength range of invisible light, and
the wavelength λ/2 is a wavelength range of visible light.

3. The optical element according to claim 2,
wherein the selective reflection center wavelength is a wavelength range of infrared light.

4. The optical element according to claim 1,
wherein the cholesteric liquid crystal layer has a region where the refractive index nx in the slow axis direction and the refractive index ny in the fast axis direction satisfy nx>ny and a region where the refractive index nx in the slow axis direction and the refractive index ny in the fast axis direction satisfy nx=ny.

5. The optical element according to claim 2,
wherein the cholesteric liquid crystal layer has a region where the refractive index nx in the slow axis direction and the refractive index ny in the fast axis direction satisfy nx>ny and a region where the refractive index nx in the slow axis direction and the refractive index ny in the fast axis direction satisfy nx=ny.

6. The optical element according to claim 3,
wherein the cholesteric liquid crystal layer has a region where the refractive index nx in the slow axis direction and the refractive index ny in the fast axis direction satisfy nx>ny and a region where the refractive index nx in the slow axis direction and the refractive index ny in the fast axis direction satisfy nx=ny.

7. A reflective sheet comprising:
the optical element according to claim 1.

* * * * *